Feb. 14, 1967 G. L. NIGON 3,303,544
CLAMPING RINGS
Filed Sept. 23, 1965 2 Sheets-Sheet 1
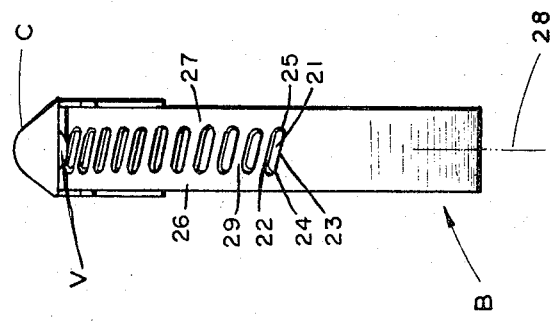
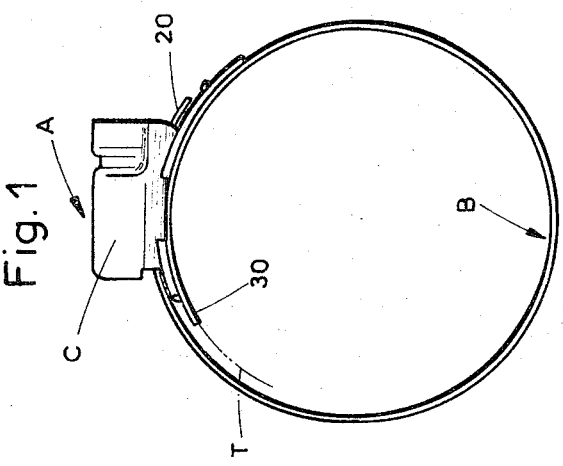
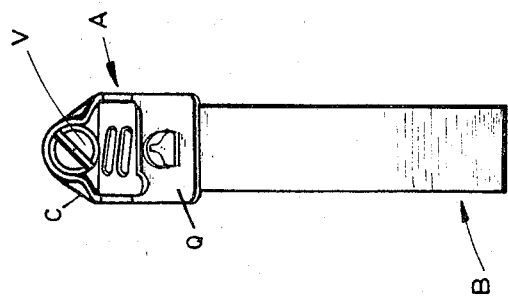

Feb. 14, 1967  G. L. NIGON  3,303,544
CLAMPING RINGS
Filed Sept. 23, 1965  2 Sheets-Sheet 2
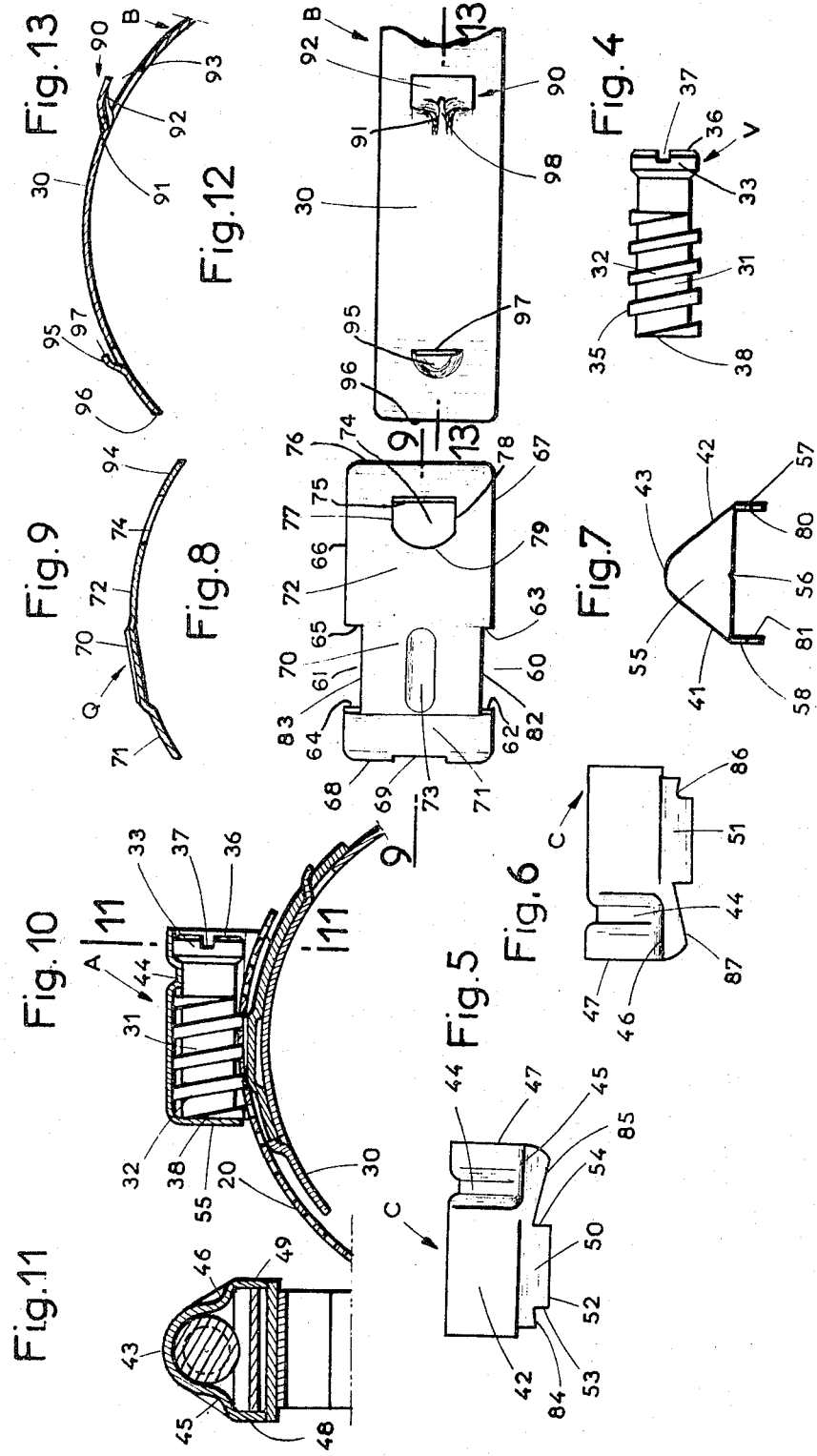

United States Patent Office 3,303,544
Patented Feb. 14, 1967

3,303,544
CLAMPING RINGS
Georges Louis Nigon, 10 Rue Papillon, Paris, France
Filed Sept. 23, 1965, Ser. No. 489,538
Claims priority, application France, Mar. 23, 1965,
10,363
2 Claims. (Cl. 24—274)

The present invention relates to clamping rings. The use of such clamping or fastening rings has been widely developed in a great number of technical fields, where many different sizes of clamping rings of various materials are being resorted to, selected as a function of their mechanical and/or corrosion strength.

It is a general object of the invention to provide an improved type of clamping ring which is better suited to the operating conditions in practice than the known types of clamping rings.

It is another object of the invention to provide a clamping ring of a simple and economical construction.

It is a further object of the invention to provide a clamping ring which may be readily placed in position, while reducing the effects of unskilful handling during the setting thereof.

It is still another object of the invention to provide a clamping ring assuring a strong clamping action.

It is finally an object of the invention to provide a clamping ring which does not damage the clamped piece.

The clamping ring according to the invention is of the type wherein a clamping band or strip carries, adjacent one of its end portions, an actuating device including a screw member housed in a casing and presents adjacent its other end, transverse slots or cut-out portions, in such a manner that through the cooperation of said slots with the threading of the screw, said other end portion of the band or strip may be moved in one or the other direction relative to said first end portion, thus achieving the clamping or unclamping of the pipe, tube or the like, on which the clamping ring is secured.

An important feature of the invention lies in the actuating device, comprising the actuating screw member and the housing accommodating the same.

It is another feature of the invention that, although remaining entirely accessible, the head of the screw is completely housed inside the casing, so that, during a clamping operation, and upon the screw being rotated by means of a screw-driver, there is practically no risk of damaging an adjacent piece when the screw-driver slips accidentally from the head slot of the screw.

According to a further feature of the invention, the blocking of the screw relative to the casing for preventing the translation movement thereof is achieved by a single rib formed on the casing which, moreover, increases the rigidity of the latter.

The invention will be best understood from the following description and appended drawings, wherein:

FIGURE 1 is an elevational front view of a clamping ring according to the invention.

FIGURE 2 is an elevational view, at right angles with that of FIGURE 1.

FIGURE 3 is an elevational view, shown also at right angles with that of FIGURE 1, but facing the end portion of the actuating device opposite to that illustrated in FIGURE 2.

FIGURE 4 is a side elevational view of a screw member.

FIGURE 5 is a side elevational view of a casing.

FIGURE 6 is a view similar to that of FIGURE 5, showing the opposite side of said casing.

FIGURE 7 is an end view of said casing.

FIGURE 8 is a plan view of a bearing plate.

FIGURE 9 is a cross-sectional view along line 9—9 of FIGURE 8.

FIGURE 10 is a longitudinal cross-sectional view of the clamping ring, at the portion thereof including the actuating device.

FIGURE 11 is a cross-sectional view along line 11—11 of FIGURE 10.

FIGURE 12 is a plan view of the end portion of the band or strip for attaching the actuating device.

FIGURE 13 is a cross sectional view along line 13—13 of FIGURE 12.

The clamping ring according to the invention comprises a metal band or strip B (FIGURES 1 to 3), which is formed with slots or windows 21 arranged in parallel relationship, transverse to but slightly slanted relative to the edges of said band or strip, and which may be obtained simply by a stamping process. Each one of the slots is bounded by two parallel sides 22 and 23 joined by arcuate curves 24 and 25. The width of the band portion comprising the slots is substantially half of the total width, the slots leaving two marginal zones 26 and 27 which are symmetrical relative to the mean longitudinal plane 28. The height of the bands 29 between two successive slots is substantially equal to the height of said slots.

The other end portion 30 (FIGURE 1) of band or strip B comprises no slots or windows and carries the actuating device A according to the invention, consisting of three parts: a cap member C, a screw V and a plate Q, the cap and plate assembly forming a casing.

Screw V (FIGURE 4) has a cylindrically shaped body 31 extending from one end to the other, formed with a thread of a transverse rectangular section 32 which, in the embodiment shown, consists of a single thread. According to the invention, head 33 of the screw has a cylindrical profile and its external side surface is of the same diameter as that of the outer surface 35 of the thread. The front surface 36 of head 33 presents the usual slot 37 for inserting a screw-driver or the like, while the rear face 38 thereof is flat.

Cap C (FIGURES 5 to 7), adapted to receive the screw has the general shape of a triangular prism, with two oblique substantially flat faces 41 and 42 interconnected through a rounded-off portion 43. Adjacent its front portion, i.e. the portion directed towards the user, arranged such as to enable the screw to be suitably actuated, the cap is formed with a transversal rib 44 connecting two longitudinal ribs 45 and 46 leading to the front edge 47 of the casing. The front portion of the latter, bounded by rib 44, is of a substantially cylindrical shape, as best shown in FIGURE 11, and has curved portions formed by ribs 45 and 46 interconnecting it to two parallel legs 48 and 49 prevailing over the whole length of the cap or casing. The lower edges of the cap are cut out in such a manner as to form rectangular elongated lugs 50 and 51, with their sides 52, 53 and 54. Cap C is completely opened towards its front portion. Adjacent the rear end thereof, it is partially closed by a wall 55 (FIGURE 7) the edge 56 of which connects legs 48 and 49 at the upper end thereof, the rear ends of the latter being visible at 57 and 58.

The casing is formed by the already described cap C and a plate member Q (FIGURES 8 and 9). The plate has a generally rectangular shape in plan view, but is formed with notches 60 and 61, respectively bounded by sides 62, 63 for the first notch, and by sides 64, 65 for the second, joining the longitudinal edges 66 and 67. The plate has a width slightly larger than that of the band. The rear side 68 of the plate is formed with a notch 69 of small depth. The portion of the plate bounded by notches 60 and 61 forms a substantially plane platform 70, slightly raised relative to a small curved end portion 71 and a large curved end portion 72, the curving being such as to correspond to the mean diameter of the pipes, conduits or the like to be clamped. A slight longitudinal cavity 73 is formed in said platform 70. A groove 74 is formed in the end portion 72, with a rectilineal edge 75 parallel to the front side 76 of the plate and two longitudinal sides 77 and 78 interconnected by an arc 79.

The spacing between the inner faces 80 and 81 (FIGURE 7) of lugs 50 and 51 of the cap is substantially equal to the distance between bottoms 82 and 83 of notches 60 and 61 of the plate.

Screw member V, which is of a particularly simple construction, is located inside cap C with its rear face 38 in engagement with the wall, the screw being longitudinally blocked by cooperation both of the front face 38 and wall 55, and by cooperation of its head 33 with rib 44; the assembly is placed on plate Q with the lugs 50 and 51 of Cap C being inserted into the notches 60 and 61 the length of which is made, to this end, slightly greater than that of the lugs. According to the invention, the interlocking of the cap and the plate is achieved by arc-welding the leg portions 48 and 49 to the plate Q, said legs being formed with oblique portions 84, 85 and 86, 87, thus effecting the assembly of the actuating device.

Said device is adapted to be detachably mounted on end portion 30 (FIGURES 12 and 13) of the band or strip B which carries, to this end, a hook member 90 formed by simply cutting out or stamping the band, said hook presenting an attachment 91 formed with a stiffening rib 98 and a widened head 92 leaving a spacing 93 with the remainder of the band wherein portion 94 (FIGURE 9) of the plate Q is located, hook 90 being inserted into the cavity or cutout portion 74 the edge of which bears against the attachment 91 of the hook.

A slight projection or slash 95, in the shape of a half-moon, is formed on portion 30 of the band adjacent the outmost edge 96. Said projection cooperates with a notch 69, the edge 97 of the projection engaging the edge of the notch 69, to obtain and maintain the centering of the actuating device relative to the band or strip.

When the actuation device has been assembled with the band, the clamping of pipe T or the like (FIGURE 1) is effected in the usual manner. After surrounding the pipe with the opened clamping ring, i.e. the ends of which are free, the end portion 20 of the band is inserted into the free space between plate Q and the edge 56 of wall 55. The slots 21 engage the threading 32 of screw V, and by rotating the latter clockwise by means of a screw-driver inserted in slot 37, said end portion 20 of the band is pulled inwardly of the casing, whereby the diameter of the clamping ring is reduced. Head 33 of the screw is entirely located inside a bezel formed by the front portion of the cap encompassing the head, and in engagement therewith over approximately a half-circumference. The guiding of the screw is effective over the whole length, its thread 32 being in contact through its external surface 35 with the rounded-off portion 43 (FIG. 11) presenting a corresponding curvature. The maintaining in a longitudinal direction of screw V relative to cap C is achieved both by rib 44 and by the bottom or wall 55. All the turns of the thread are effectively in engagement with the slots. The clamping ring presents no inner projection, so that there is no risk of damaging the pipe, whatever may be the clamping strength. The clamping device is applied substantially along an angle of 360° against the pipe or cable.

The actuating device being detachably mounted, it is possible to separately store the bands or strips, on one hand, and the actuating devices on the other, the fitting of an actuating device on a band being effected at the time of the sale or use. Moreover, the same actuating device is adapted for use with different lengths of bands or strips.

What is claimed is:

1. A pipe clamp comprising a clamping strip provided with transverse oblique slots at one end thereof, an actuating device supported at the other end of the strip and comprising a cap including a flat wall closing one end of said cap, a plate integral with the cap, means on the strip and on the plate cooperating for mutually displaceable assembly thereof; a threaded rod including a head at one end, said rod further including screw threads engageable with the transverse oblique slots and a portion of reduced diameter between the head and the threads; the said rod being positioned entirely inside of the cap and secured against longitudinal movement relative to the latter by cooperation of the other end thereof with the said flat wall, the said cap comprising a transverse rib projecting inwardly to cooperate with the reduced diameter portion of the rod, and two longitudinal ribs between the end of the cap opposite said flat wall and the transverse rib and joining the latter to define at the forward part of the cap a portion of substantially semi-cylindrical configuration encompassing the head of the rod.

2. A pipe clamp according to claim 1 wherein the cap has a vaulted upper internal surface by which it cooperates with the threads of the threaded rod and the head of the rod to locate the latter.

References Cited by the Examiner

UNITED STATES PATENTS 2,944,314 7/1960 Black _____ 24—279

FOREIGN PATENTS 1,008,485 2/1952 France.
536,267 5/1941 Great Britain.
914,349 1/1963 Great Britain.

WILLIAM FELDMAN, *Primary Examiner.*

D. GRIFFIN, *Assistant Examiner.*